Patented Feb. 26, 1929.

1,703,329

UNITED STATES PATENT OFFICE.

ISRAEL W. WILENCHIK, OF PHILADELPHIA, PENNSYLVANIA.

PROCESS FOR SEPARATING COPPER FROM NICKEL.

No Drawing.   Application filed April 16, 1928.   Serial No. 270,578.

This invention relates to an improved process for the separation of copper from nickel and is primarily adapted to be used in separating these metals from their alloys, although capable of use for copper-nickel slags and mattes.

The alloys subjected to the treatment hereinafter described may vary as to the relative proportions of copper and nickel present and may also contain small quantities of other metals such as iron, zinc, aluminum and tin.

It has been suggested in the separation of the sulphides of nickel and copper which constitute the matte ordinarily produced in the smelting of nickel ore, to subject the molten matte to the action of sodium sulphate and coke, then smelting the mixed mass in a furnace and permitting the copper sulphide dissolved in the sodium sulphide to separate under the influence of gravity from the heavier undissolved nickel sulphide. In my improved process a different mode of procedure is necessary in that I deal with the copper and nickel as metals in their alloys. I add to the alloy in addition to the sodium sulphate and coke, a quantity of sulphur and calcium sulphate. The presence of the latter two substances produce improved results in that a better separation of the two layers of sulphides follows. The sulphur acts as a flux in addition to its sulphurizing action and brings about a fusion of the alloy at a low temperature. The calcium sulphate requires a higher temperature for reduction to its sulphide by coke than does the sodium sulphate. As a result the calcium sulphide sulphurizes the metals at the highest temperature attained in the fusion.

A sample of the alloy to be treated is first analyzed to determine the proportions of nickel and copper present. From the results thus obtained the alloy is placed in a reverberatory furnace with a weighted quantity of the intimately mixed sulphurizing agent composed of sulphur, sodium sulphate, calcium sulphate and coke. When heated the sulphur acts on the alloy at a low temperature; at a higher temperature the sodium sulphate is reduced by the coke and supplies the sulphur needed for conversion of the metals to sulphides; while at the highest temperature attained the conversion is carried on by the reduced calcium sulphate.

When the metals are sulphurized, the molten mass is run into an iron pot or settler. On cooling the copper sulphide, alkali sulphides and the sulphides of some of the other metals such as iron or zinc originally present in the alloy, will be found at the top of the cooled mass in the pot or settler, while the nickel sulphide will be found to have settled to the bottom. The line of cleavage is distinct and well marked. The layers are separated, each crushed and subjected to treatment in a reverberatory furnace for conversion into oxides in a manner well known in the art. The next step is reduction of the oxides to their metals. The nickel oxide may be mixed with an equal weight of charcoal and reduced to metal at a white heat in a crucible furnace. The copper oxide may be subsequently converted into "blister" copper in a well known manner. The metals may also be subjected to any of a number of refining processes.

I reserve the right to make any changes in the specific details of my process and to be limited only by the scope of the appended claims.

Having described my invention as required by statute, what I claim and desire to secure by Letters Patent is:

1. A process for separating copper from nickel in their alloys, which consists in subjecting the alloy together with an intimate mixture of sulphur, sodium sulphate, calcium sulphate and coke to the action of heat until molten, then pouring the molten mass into a settler, whereby upon cooling the sulphides of copper and nickel separate by gravity, and subjecting the sulphides after mechanical separation to separate treatment for conversion into oxides and subsequently into metals.

2. A process for separating copper from nickel in their alloys, which consists in subjecting the alloy together with a mixture of sulphur, sodium sulphate, coke and an alkali sulphate reducible to sulphide at a temperature higher than the sodium sulphate, to the action of heat until molten, pouring the molten mass into a settler whereby upon cooling the sulphides of copper and nickel are separated, and then subjecting the sulphides to individual treatment for conversion into oxides and subsequently into metals.

In testimony whereof I affix my signature.

ISRAEL W. WILENCHIK.